(12) United States Patent
Kamijo et al.

(10) Patent No.: US 6,321,341 B1
(45) Date of Patent: Nov. 20, 2001

(54) METHOD AND APPARATUS FOR MEASURING THE POWER CONSUMPTION OF A COMPUTER

(75) Inventors: Noboru Kamijo, Fujisawa; Shin Kurogi; Tadanobu Inoue, both of Yamato, all of (JP)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 09/218,885

(22) Filed: Dec. 22, 1998

(51) Int. Cl.⁷ .................................................... G06F 1/26
(52) U.S. Cl. .......................... 713/340; 713/330; 365/227
(58) Field of Search .................... 713/300–340; 365/226, 227, 228, 229

(56) References Cited

U.S. PATENT DOCUMENTS

| | | | |
|---|---|---|---|
| 5,546,568 | * 8/1996 | Bland et al. | 713/501 |
| 5,606,511 | * 2/1997 | Yach | 702/64 |
| 5,900,026 | * 5/1999 | Ryu | 713/320 |
| 5,928,365 | * 7/1999 | Yoshida | 713/324 |

* cited by examiner

Primary Examiner—Ario Etienne
(74) Attorney, Agent, or Firm—Douglas W. Cameron; Anne Vachon Dougherty'

(57) ABSTRACT

The present invention comprises the steps of: detecting a change in a power control signal (e.g., a CPU internal clock control signal, a supply clock control signal to a CPU from the outside, an interrupt signal relative to a CPU (e.g., an CPU SMI# signal (CPU system management interrupt signal)), or a low power control signal to each component) and storing the result of the detection in a storage device, wherein the power control signal represents a control instruction associated with the power consumption to a component of a computer; and periodically measuring either a first signal concerning the power consumption by a specific computer component or a second signal concerning power consumed by the entire computer, or both the first and the second signals, and storing the result of the measurement in the storage device. The computer components are internal computer components, including a battery, but are also such externally connected components as a CD-ROM, an FD drive or a docking station.

21 Claims, 9 Drawing Sheets

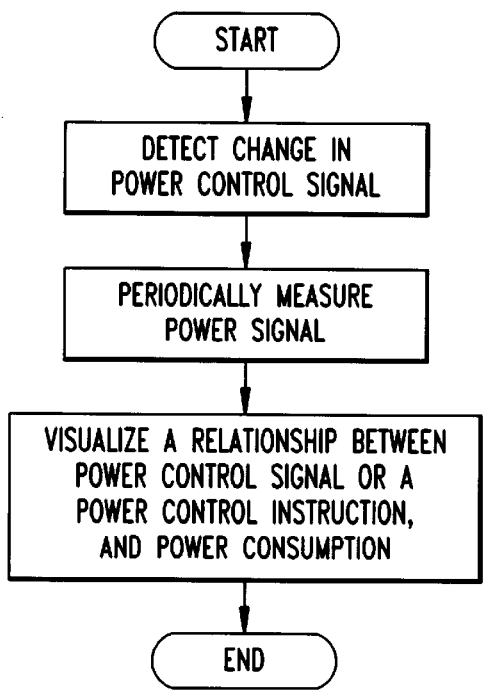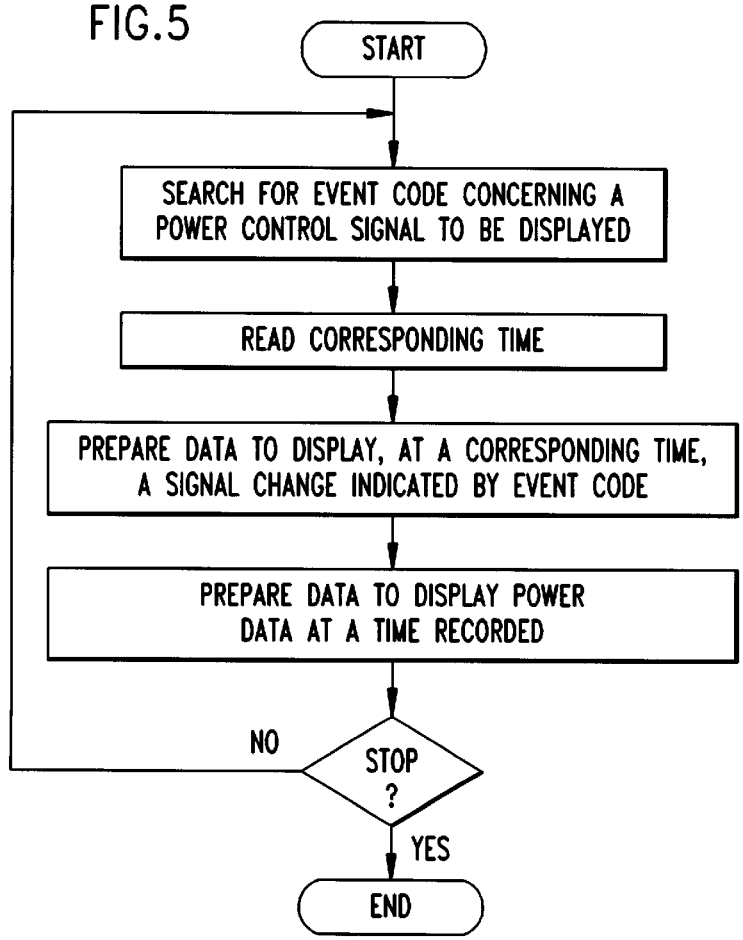

FIG.4

```
Code  Data
 10  | 000000 | event=10h timer=000000h                        <=== Measurement Start
  .  |   .    |   .
  .  |   .    |   .
 11  | ffffff | event=11h timer=ffffffh                        <=== Timer Wrap
  .  |   .    |   .
  .  |   .    |   .
 21  | cc8dea | event=21h timer=cc8deah   STPCLK# Active       <=== Enter Stop Grant State
 2c  | cc8e50 | event=2ch timer=cc8e50h   CPU_STP# Active      <=== Enter Stop Clock State
 28  | ccbae8 | event=28h timer=ccbae8h   CPU_STP# Inactive    <=== Exit  Stop Clock State
 81  | ccbae9 | event=81h timer=ccbae9h   INTR     occur       <=== Timer Interrupt
 20  | ccc0b8 | event=20h timer=ccc0b8h   STPCLK# Inactive     <=== Exit  Stop Grant State
 70  | 263843 | event=70h data =263843h   CH0 Power Data       <=== Periodical Power Data
 71  | 2f5d4f | event=71h data =2f5d4fh   CH1 Power Data       <=== Periodical Power Data
 72  | 23453f | event=72h data =23453fh   CH2 Power Data       <=== Periodical Power Data
 21  | ccc0cb | event=21h timer=ccc0cbh   STPCLK# Active       <=== Enter Stop Grant State
 20  | ccc170 | event=20h timer=ccc170h   STPCLK# Inactive     <=== Exit  Stop Grant State
 21  | ccc1ad | event=21h timer=ccc1adh   STPCLK# Active       <=== Enter Stop Grant State
 20  | ccc266 | event=20h timer=ccc266h   STPCLK# Inactive     <=== Exit  Stop Grant State
 21  | ccc2a3 | event=21h timer=ccc2a3h   STPCLK# Active       <=== Enter Stop Grant State
 20  | ccc35b | event=20h timer=ccc35bh   STPCLK# Inactive     <=== Exit  Stop Grant State
 21  | ccc39a | event=21h timer=ccc39ah   STPCLK# Active       <=== Enter Stop Grant State
 2c  | ccc3f4 | event=2ch timer=ccc3f4h   CPU_STP# Active      <=== Enter Stop Clock State
 28  | ccf08c | event=28h timer=ccf08ch   CPU_STP# Inactive    <=== Exit  Stop Clock State
 81  | ccf08c | event=81h timer=ccf08ch   INTR     occur       <=== Timer Interrupt
  .  |   .    |   .
  .  |   .    |   .
 11  | ffffff | event=11h timer=ffffffh                        <=== Timer Wrap
  .  |   .    |   .
  .  |   .    |   .
 21  | cc8dea | event=21h timer=ec8deah   STPCLK# Active       <=== Enter Stop Grant State
 2c  | cc8e50 | event=2ch timer=ec8e50h   CPU_STP# Active      <=== Enter Stop Clock State
 28  | ccbae8 | event=28h timer=ecbae8h   CPU_STP# Inactive    <=== Exit  Stop Clock State
 81  | ccbae9 | event=81h timer=ecbae9h   INTR     occur       <=== Timer Interrupt
 20  | ccc0b8 | event=20h timer=ecc0b8h   STPCLK# Inactive     <=== Exit  Stop Grant State
 70  | 263843 | event=70h data =263843h   CH0 Power Data       <=== Periodical Power Data
 71  | 2f5d4f | event=71h data =2f5d4fh   CH1 Power Data       <=== Periodical Power Data
 72  | 23453f | event=72h data =23453fn   CH2 Power Data       <=== Periodical Power Data
 21  | ccc0cb | event=21h timer=ecc0cbh   STPCLK# Active       <=== Enter Stop Grant State
  .  |   .    |   .
  .  |   .    |   .
 14  | 2387cf | event=14h timer=2387cfh                        <=== Measurement Stop
     201  203 205       207       209                             211
```

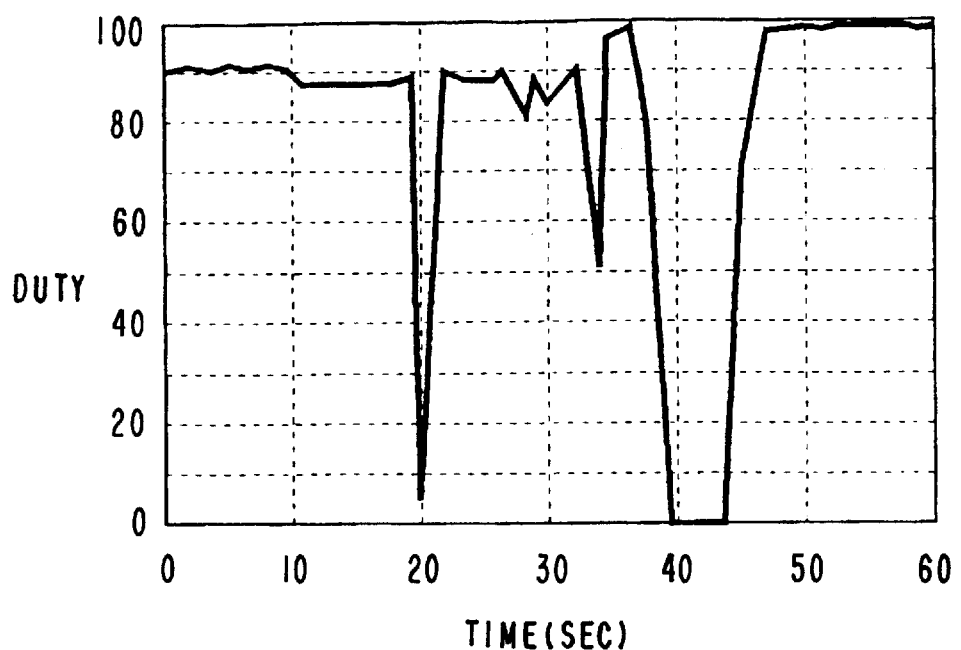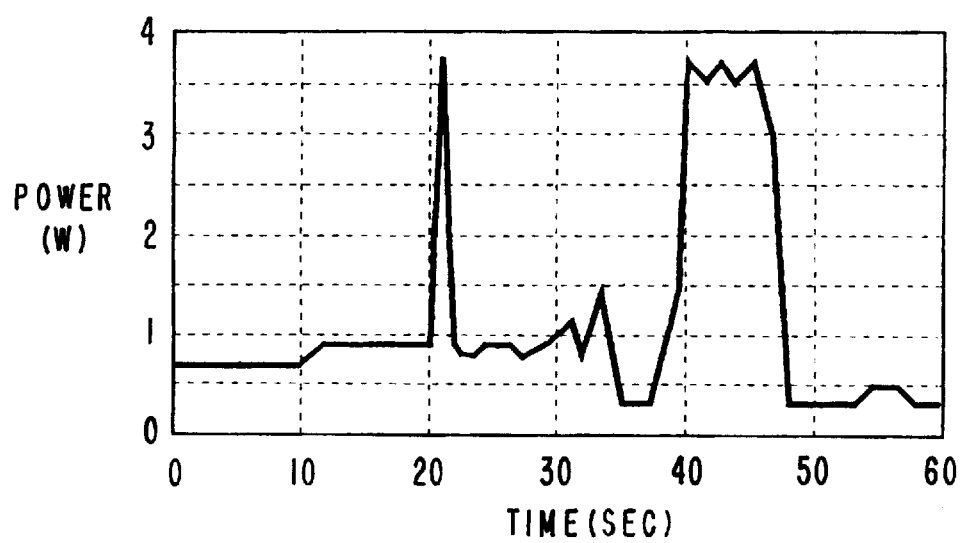
FIG.6

| STPCLK# INACTIVE | | STPCLK# ACTIVE | |
| --- | --- | --- | --- |
| PERIOD | FREQUENCY | PERIOD | FREQUENCY |
| 61 | 684803 | 184 | 638049 |
| 62 | 54874 | 185 | 101104 |
| 686 | 11089 | 2000 | 9980 |
| 213 | 2396 | 50 | 6770 |
| 687 | 1767 | 49 | 6118 |
| 212 | 1196 | 32 | 2221 |
| 214 | 1058 | 33 | 1684 |
| 73 | 854 | 31 | 892 |
| 71 | 654 | 172 | 616 |
| 72 | 644 | 179 | 551 |

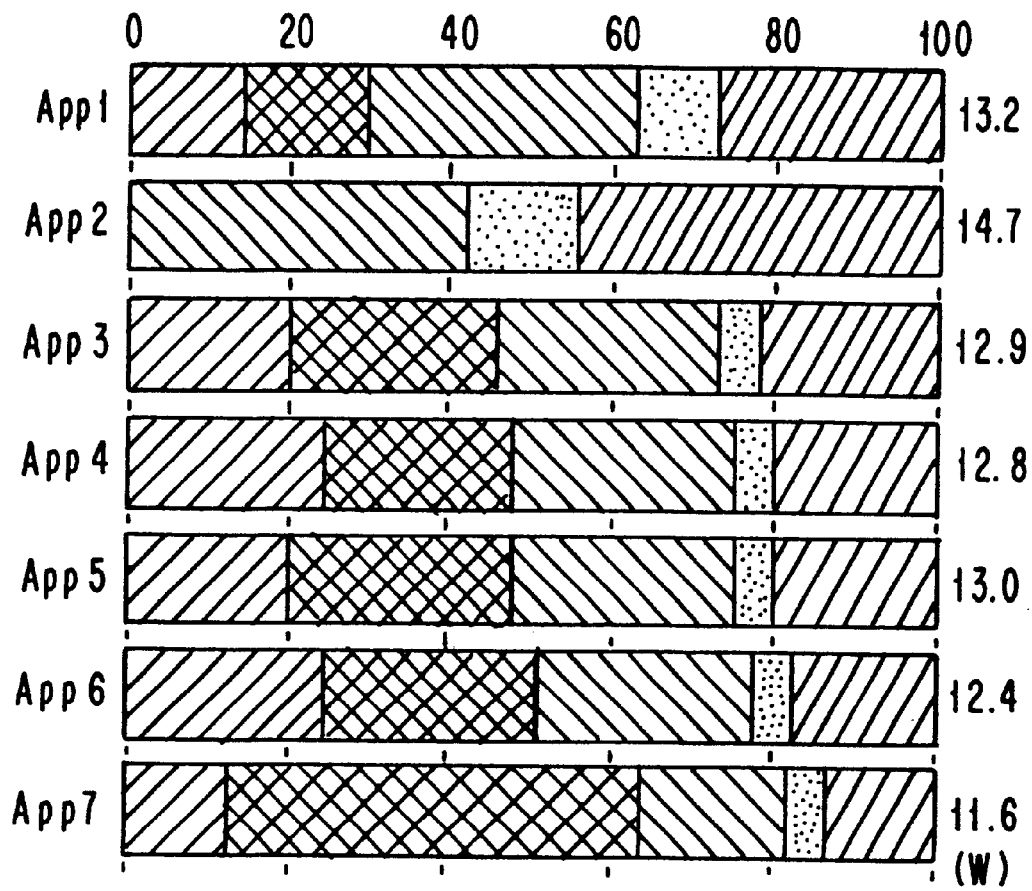
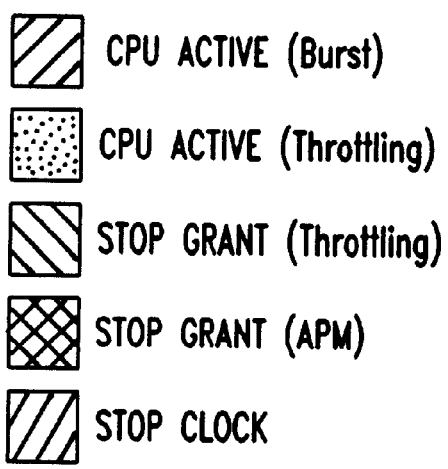
FIG.10

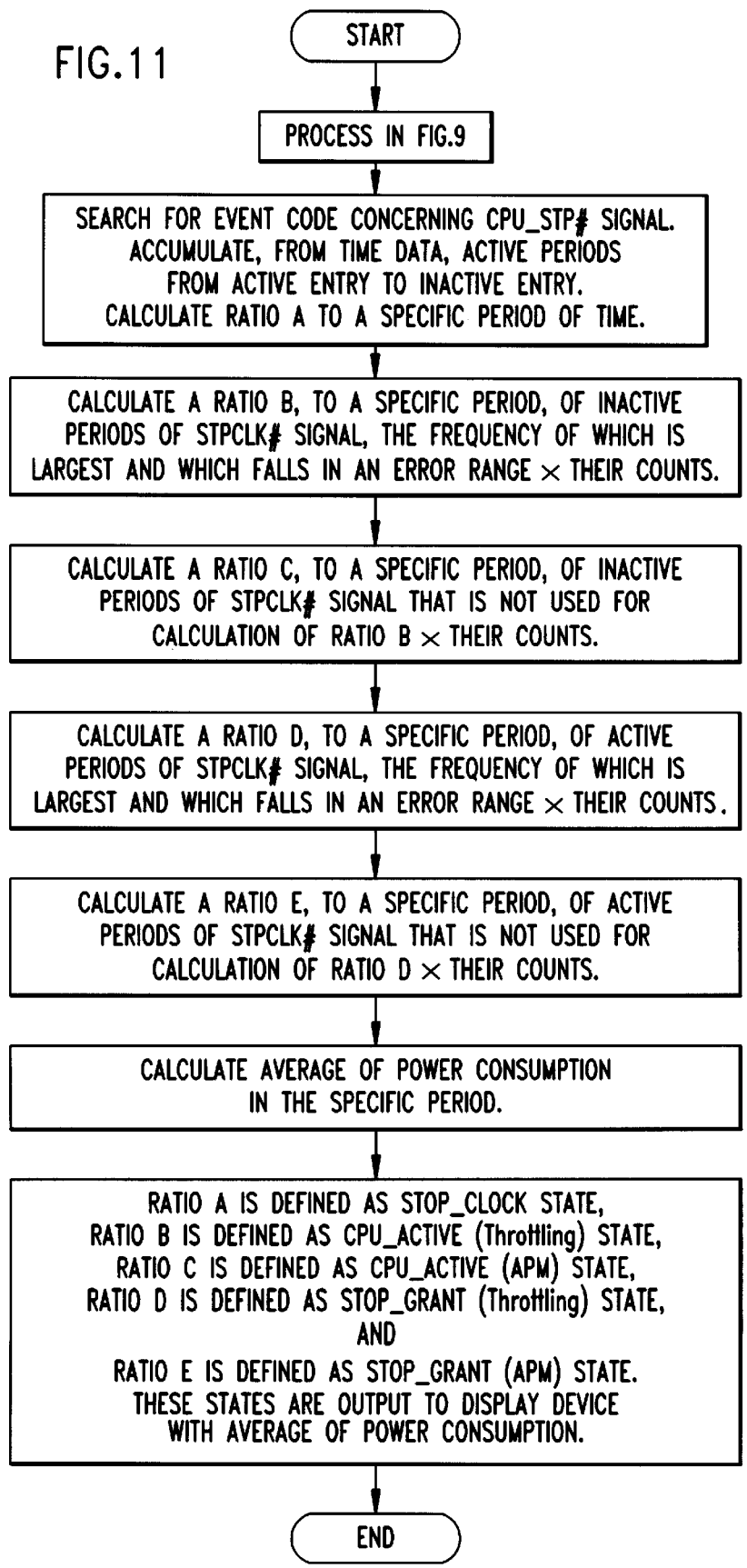

METHOD AND APPARATUS FOR MEASURING THE POWER CONSUMPTION OF A COMPUTER

FIELD OF THE INVENTION

This invention relates to an analysis of the power consumption of a computer.

BACKGROUND OF THE INVENTION

Power management techniques are very important for computers, especially for portable computers. Since an operating period can be extended by reducing power consumption, various power management techniques have been developed. As a basic data for the development of the power management technique, the power consumed by a computer, or by components of a computer, must be measured. For this measurement, Intel Corp. has developed a power consumption measurement tool called the Intel Power Analyst* (* indicates that the term may be a trademark of the respective owner). This tool can display in real time the power consumed by each sub-system, such as a CPU, a memory component or a hard disk. Benchmarks for battery operation, such as SYSmark32* for Battery Life* (product of BAPCo) or BatteryMark* (product of Ziff-Davis Benchmark Operation), can display only the operating time for a battery.

While there are some conventional products that can measure the power consumed by the components of a computer and by an entire system, they cannot clearly delineate for development engineers the relationship between the power consumption and a signal, such as a STPCLK# (# indicates low active) that is a kind of interrupt signal to a Pentium* processor (a trademark of Intel Corp.), that is associated with the power consumption of a CPU or that of an entire system. If this relationship is clear, the technique for controlling the signal to reduce the power consumption can be more easily developed.

It is, therefore, one object of the present invention to obtain a clear relationship between the power consumption and a signal (hereinafter referred to as a power control signal), such as a STPCLK#, that is associated with the power consumption by a CPU or by an entire system.

It is another object of the present invention to measure and record the power control signal and the power consumption in order to obtain a clear relationship between the power control signal and the power consumption.

SUMMARY OF THE INVENTION

These and other objectives are realized by the present invention for a power consumption analysis method comprising the steps of: detecting a change in a power control signal and storing the result of the detection in a storage device, wherein the power control signal represents a control instruction associated with the power consumption to a component of a computer; and periodically measuring either a first signal concerning the power consumption by a predetermined component of the computer or a second signal concerning the power consumption by the entire computer, or both the first and the second signals, and storing the result of the measurement in the storage device. The power control signals are, for example, a CPU internal clock control signal, a supply clock control signal to a CPU from the outside, an interrupt signal relative to a CPU (e.g., an SMI# signal for a Pentium processor (CPU system management interrupt signal)), a low power control signal to each component, etc. This signal may be provided not only along one signal line, but also along a plurality of signal lines. The computer components are internal computer parts, including a battery, but are also such externally connected components as a CD-ROM, an FD drive or a docking station. By acquiring the power control signals and data concerning the power consumption from the computer in this combination, important information can be assembled for the control to reduce the power consumption.

Specifically, the results of the detection and of the measurement, which are stored in the storage device, are employed to characterize the relationship between the power control signal (or a control instruction) and the power consumption. The following various forms can be used for characterization/visualization of the relationship: (1) the change in the power control signal and the change in the power consumption are displayed along the same time axis; (2) the change in the contents of the control instruction and the change in the power consumption are displayed along the same time axis; (3) the state of the computer or the state of the computer component is identified and displayed; (4) the ratio of each state of the power control signal and data (e.g., average of the power consumption) concerning the power consumption for a predetermined period of time are displayed; (5) a period (may include a frequency) of each state of the power control signal and data concerning the power consumption for a predetermined period of time are displayed; (6) the period and a value for each state of the power control signal for a predetermined period of time are displayed; (7) statistics are acquired for the length of the period of each state of the power control signal for a predetermined period of time, followed by identifying the state of the computer in accordance with the statistics, and displaying the results. These forms are only examples, and the first acquired data can be processed, as needed.

It should be noted that, for display, two waveforms may be displayed along the same axis; or, with the scales of the time axes being the same (the same type of time axis), two waveforms are displayed in the upper and lower portions of the display. The power consumption may be that at a specific time point, or may be an average during a predetermined period. The change in the power control signal represents a change from 0 to 1 and from 1 to 0 when only one signal line is employed. The change in the contents of the control instruction includes, for example, a change in CPU throttling duty (see U.S. Pat. No. 5,546,568 for the CPU throttling). The periods of the individual states of the power control signal include a sustained period of the state each time a signal state is changed.

It is also possible to produce an analysis apparatus that performs the process steps that have been described. The analysis apparatus includes a measurement device for detecting a change in a power control signal, which represents a control instruction associated with the power consumption and is output to a connected computer component, for measuring a signal concerning the power at a connected computer component, and for storing the detection result and the measurement result in a storage device. A processor for performing the previously described characterization process may be incorporated in the analysis apparatus, or the analysis apparatus may be connected to another computer and may transmit data to the computer to cause it to perform this process.

BRIEF DESCRIPTION OF THE DRAWINGS

The invention will now be described in greater detail with specific reference to the appended drawings wherein:

FIG. 2 is a flowchart showing the processing according to the present invention;

FIG. 4 is a diagram for explaining the format of data that a signal monitor 115 stores in a memory 117;

FIG. 5 is a flowchart for the processing performed by a visualization processor 119;

FIG. 6 is a diagram showing an example screen on a display device 121;

FIG. 10 is a diagram showing an example screen on the display device 121; and

FIG. 11 is a flowchart showing the processing performed by the visualization processor 119.

DESCRIPTION OF THE PREFERRED EMBODIMENT

Figure 1:
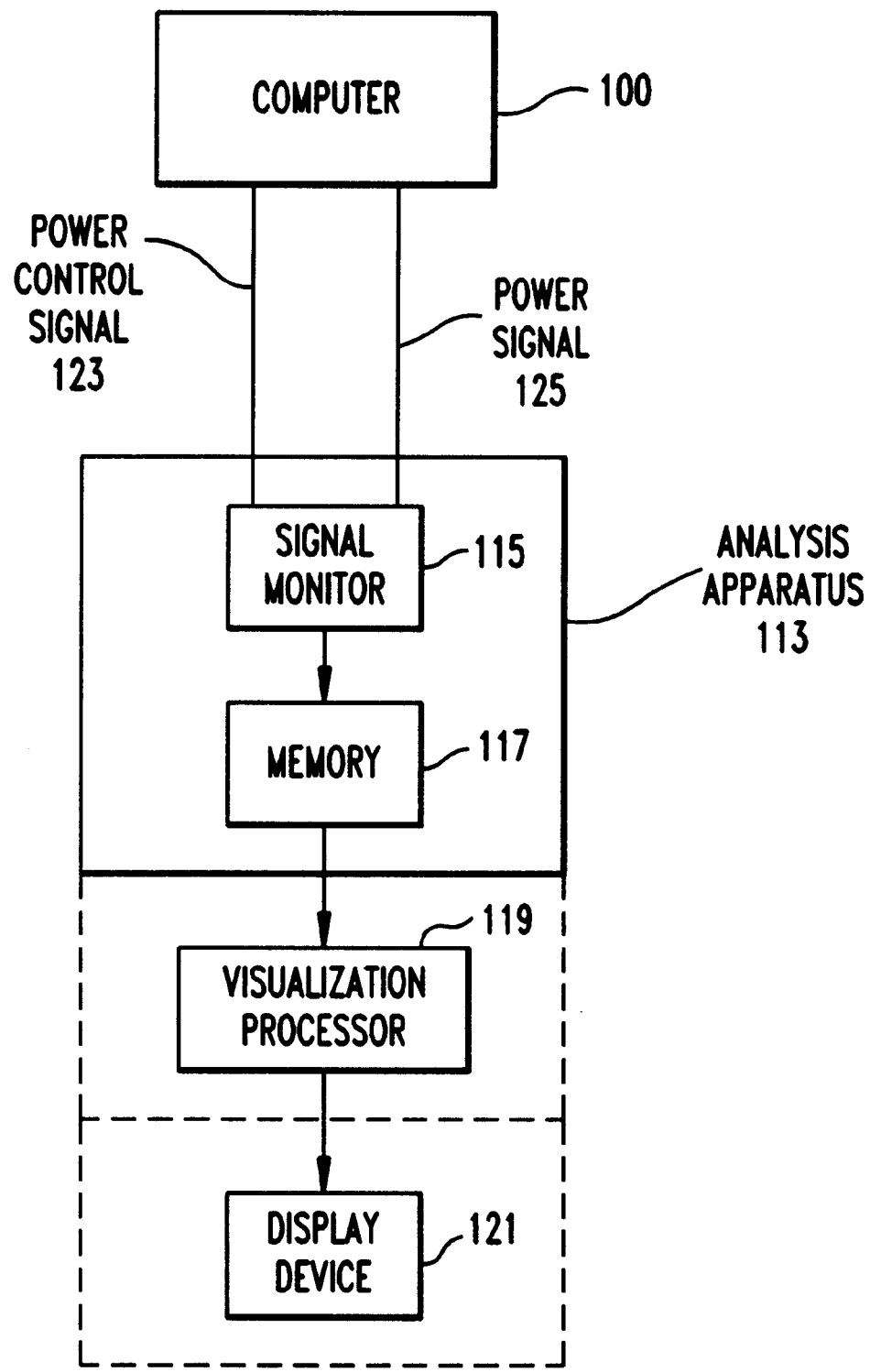
FIG. 1 is a functional block diagram according to the present invention.

FIG. 1 shows an example arrangement according to the present invention. A computer 100 is an object to be examined. A specific power control signal 123 and a power signal 125 are transmitted from the computer 100 to an analysis apparatus 113. The analysis apparatus 113 includes a signal monitor 115 and a memory 117. The signal monitor 115 includes a timer (not shown), and monitors the power control signal at individual times measured by the timer, and records changes in the power control signal. Similarly, it monitors a power signal at individual times measured by the timer, and records the power consumption. The memory 117 is used to store the data prepared by the signal monitor 115. The data in the memory 117 are processed by a visualization processor 119, and the results are displayed on a display device 121. The characterization (also known as "visualization") processor 119 and the display device 121 may be included in the analysis apparatus 113, as represented by broken lines in FIG. 1. The control of the analysis apparatus 113 may be performed by an internally provided controller, or by an external computer that is connected to it. The visualization processor 119 may serve as the controller. The basic processing is shown in FIG. 2.

The power control signal 123, for an IBM compatible machine, for example, includes an STPCLK# signal for controlling an internal clock of a CPU; a CLKRUN# signal for controlling a clock for a PCI bus; a CPU_STP# signal for controlling an external clock to be supplied to the CPU; various interrupt signals (e.g., a CPU system management interrupt signal SMI#, a system control interrupt signal SCI used for an ACPI (Advanced Configuration and Power Interface), a CPU interrupt signal INTR, an ISA/PCI bus interrupt signal INTx, etc.); and a power management signal for each part and component. The interrupt signal is not directly related to the power consumption; however, once the interrupt is issued in the low power consumption state, the low power consumption state is released, operation is resumed, and more power is therefore required. In the foregoing sense, the interrupt signal is related to the power consumption. The power signals 125 include a current signal and a voltage signal of individual parts, and a ground signal, or an analog signal and a ground signal when the parts output analog signals concerning the power.

Figure 3:
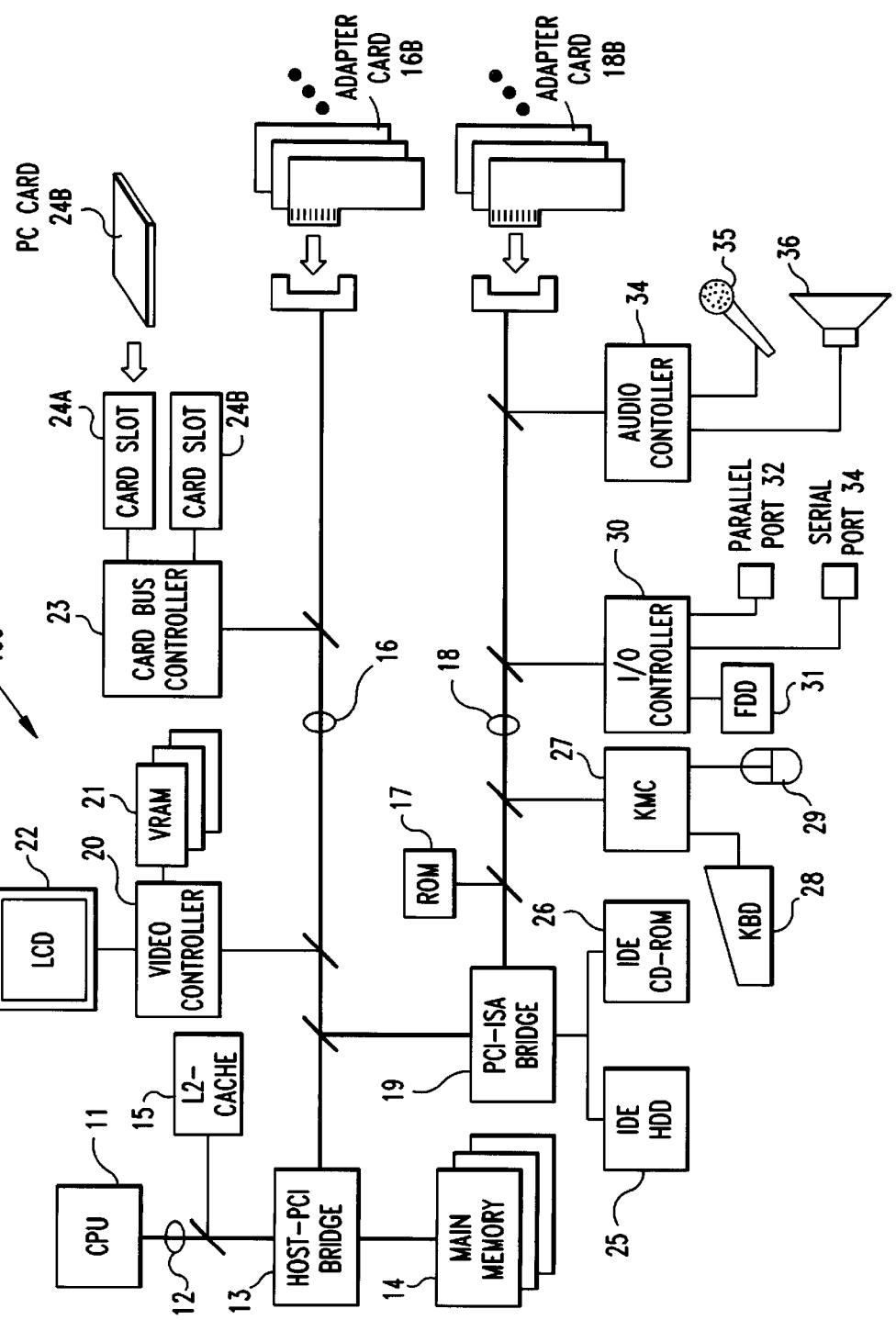
FIG. 3 is a block diagram illustrating a computer 100.

As shown for the computer 100 of FIG. 3, in many cases the power control signal line 123 is a signal line for a host-PCI bridge 13 or a PCI-ISA bridge 19. Further, since each of an IDE_HDD 25, an IDE_CD-ROM 26 and a video controller 20 in FIG. 3 may have their power management signals, these signals may be the power control signals 123. When the power signal 125 is for the entire computer 100, it is constituted by a current signal and a voltage signal (and a ground signal) output by a battery or a power source (neither of them shown). When the power signal 125 is a power signal for a part or component, it is constituted by a current signal and a voltage signal supplied by a battery or a power source to the individual interfaces of the parts. For example, a resistor is inserted across a power feed line of a component to be measured, such as an LCD 22, the IDE_HDD 25, the IDE_CD-ROM, and an adaptor card 16B or 18B or an FDD 31. Thereafter, a voltage signal at that portion, a current signal (which is obtained by a voltage drop due to the resistor), and a ground signal are employed. As previously described above, when an analog signal concerning the power is output, the power signal 125 is constituted by the analog signal and the ground signal.

An interface for the power control signal 123 and the power signal 125 may be or may not be externally provided outside of the computer 100. If necessary, the signals may have to be extended to the outside by disassembling the computer 100. In some cases, a connector is provided for easy extension, and necessary signal lines can be connected to the connector.

The monitor 115 detects changes in the thus acquired power control signal 123 at predetermined time intervals, and records, in memory 117, the time at which the changes occurred. Since the power signal 125 is normally an analog signal, the signal monitor 115 performs an A/D conversion of the power signal 125 at predetermined intervals and the obtained values are stored in the memory 117. When the power signal 125 comprises the voltage signal and the current signal, they may be multiplied together and the result may be stored, or the individual signal values may be stored. Example data received from the signal monitor 115 and stored in the memory 117 are shown in FIG. 4.

Columns 201 and 203 in FIG. 4 are 32-bit data (hexadecimal) that the signal monitor 115 writes in the memory 117. The entries in column 201 are 8-bit event codes; the entries in column 203 are 24-bit power data or time data; column 205 is the same as column 201, and indicates that the contents of column 201 are event codes; in column 207 indication is made as to whether the data is timer value or power data; in column 209 the meanings of the event codes are shown; and in column 211 remarks are entered.

The event codes describe the types of measurement signals. In this case, event code 10 means the start of timer, i.e., the initiation of a measurement; code 11 represents a timer wrap; and code 14 represents the termination of the measurement. Data for an event code having a first numeral of 1 is a timer value at the current time. Event code 21 indicates that the STPCLK# has become active, and code 20 indicates that the STPCLK# has become inactive. Event code 2c indicates that the CPU_STP# has become active, and code 28 indicates that the CPU_STP# has become inactive. Data for an event code having a first numeral of 2 is a timer value at the current time. Event code 70 designates power data of a computer component No. 0; code 71 designates power data of a computer component No. 1; and code 72 designates power data for a computer component No. 2. Event code 81 indicates that an INTR occurred. Data for an event code having a first number of 8 is used for a timer value at the current time. The event codes are arbitrarily defined, however, and other definitions may be employed.

The activities of the computer 100 recorded in FIG. 4 will now be described. At the second time cc8dea following the initiation of the timer, the STPCLK# became active and the computer 100 entered the STOP GRANT state. At time cc8e50, the CPU_STP# became active and the computer 100 entered the STOP CLOCK state. At time ccbea8, the CPU_STP# became. inactive and the computer 100 exited the STOP CLOCK state. At time ccbea9, an INTR occurred and the timer interrupt to the CPU occurred. At time ccc0b8, the STPCLK# became inactive and the computer 100 exited the STOP GRANT state. Then, periodical power data measurement was conducted. The power data for component No. 0 was 263843, the power data for component No. 1 was 2f5d4f, and the power data for component No. 2 was 23453f.

At time ccc0cb, the STPCLK# became active and the computer 100 entered the STOP GRANT state. At time ccc170, the STPCLK# became inactive and the computer 100 exited from the STOP GRANT state. At time ccc1ad, the STPCLK# became active and the computer 100 entered the STOP GRANT state. At ccc266, the STPCLK# became inactive and the computer 100 exited the STOP GRANT state. At time ccc2a3, the STPCLK# became inactive and the computer 100 entered the STOP GRANT state. At time ccc35b, the STPCLK# became inactive and the computer 100 exited from the STOP GRANT state. At time ccc39a, the STPCLK# became active and the computer 100 entered the STOP GRANT state. At ccc3f4, the CPU_STP# became active and the computer entered the STOP CLOCK state. At time ccf08c, the CPU_STP# became inactive and the computer 100 exited the STOP CLOCK state. At the same time, ccf08c, the INTR occurred and the timer interrupt to the CPU occurred. In the same manner, the activities of the computer 100 are measured and recorded until the measurements are terminated.

The processing performed by the visualization processor 119 will now be explained. The object of the processing is to characterize a relationship between the power control signal or the control instruction, and the power consumption by using the data in FIG. 4 stored in the memory 117. The forms for characterizing the relationships are:

(1) A change in the power control signal and a change in the power consumption are displayed along the same time axis;
(2) A change in the contents of the control instruction and a change in the power consumption are displayed along the same time axis;
(3) The ratio of each control power signal state and data concerning the power consumption (e.g., average of the power consumption) for a specific period of time are displayed;
(4) The period for each power control signal state and data concerning the power consumption for a specific period of time are displayed;
(5) The period and the number of each power control signal state for a specific period of time are displayed; and
(6) Statistics are acquired for the length of the period of each power control signal state for a specific period of time, the states of the computer are identified in accordance with the statistics, and the results are displayed.

In (1), the output of a logic analyzer relative to a power control signal and the output of a power meter are displayed at the same time. More specifically, a change in a power control signal can be displayed in the upper portion, and the amount of the power consumption can be displayed in the lower portion, or the two waveforms may be superimposed and displayed. When the waveforms are to be superimposed, or when there are a plurality of power control signals, different colors may be used. The amount of the power consumption may be either the amount of power momentarily consumed or an average of the power consumption from a specific time point to before passing a predetermined period of time. The visualization processor 119 finds event codes concerning the power control signals to be displayed, reads the corresponding time, and outputs to the display device 121 data to display the change in the signal represented by the event code acquired at the relevant time. The visualization processor 119 also outputs to the display device 121 data to display, in accordance with that relevant time, the power data periodically recorded. The processing is briefly described in the flowchart in FIG. 5.

Figure 7:
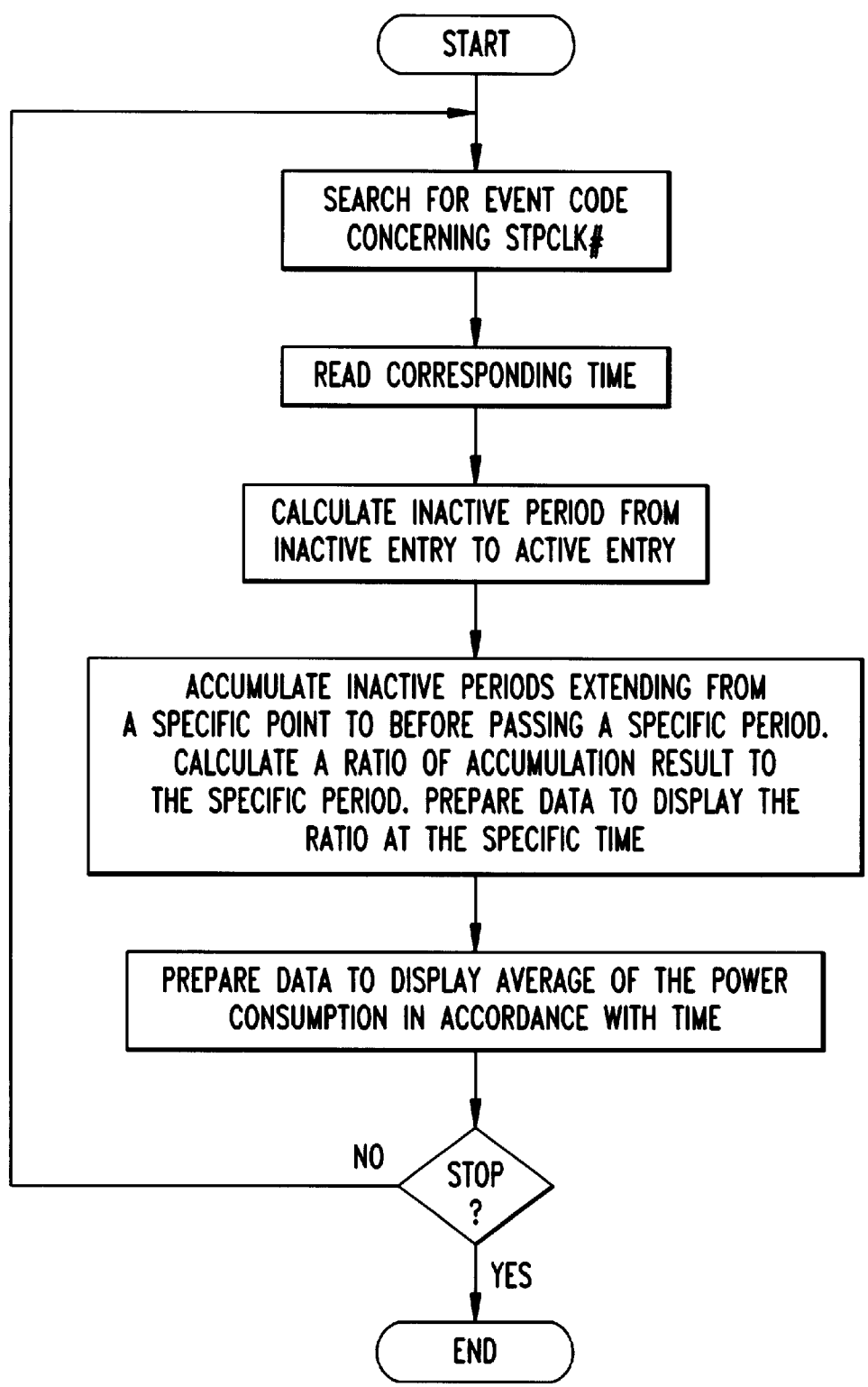
FIG. 7 is a flowchart showing the processing performed by the visualization processor 119.

The form (2) corresponds to a case where the CPU throttling duty and the amount of the power consumption are displayed, for example in FIG. 6. The CPU throttling duty is the ratio at which the CPU is operated in a unit time. Core chip PIIX4 produced by Intel employs 244 $\mu$s as the unit time and can set the CPU to operate in $\frac{1}{8}$, $\frac{1}{4}$, $\frac{3}{8}$, . . . or $\frac{8}{8}$ of the unit time. Therefore, the duty can be acquired by using the ratio of a time period in which the STPCLK# signal is inactive to a predetermined time period. The amount of the power consumption may be either the amount of power momentarily consumed, or an average of the power consumption from a specific point in time to before passing the predetermined time period. Instead of the CPU throttling duty, the count at which the STPCLK# became inactive or active during a predetermined period of time may be used. When the CPU throttling duty is employed, the visualization processor 119 finds event code associated with the STPCLK#, and employs time data to calculate the inactive period of time extending from the entry of the STPCLK# into inactive state until it enters to the active state. The inactive period of time extending from a specific point in time to just before passing the predetermined time period is accumulated to calculate the ratio of the accumulated result to the predetermined time period. Then, data for displaying the ratio at the specific point is output to the display device 121. The power data are the same as in (1). The processing is briefly described in the flowchart in FIG. 7.

The form (3) represents, for example, a case where there are displayed the average amount of the power consumption during a predetermined period, a ratio of a period in which the CPU_STP# signal is active to the predetermined period, and a ratio of a period in which the CPU_STP# signal is inactive to the predetermined period. The visualization processor 119 searches for the event code concerning the CPU_STP# signal, and calculates, from the time data, the inactive period extending from the entry into the inactive state to the entry to the active state and the active period extending from the entry into the active state to the entry to the inactive state. The inactive time during the predetermined period, and the active time during the predetermined period are accumulated respectively, and the ratio of the active time to the predetermined period and the ratio of the inactive time to the predetermined period are calculated and output. In addition, the data for power consumption during the predetermined period of time are averaged and these values are output.

The form (4) represents, for example, a case where, during the predetermined period, the period of time in which the STPCLK# signal is active and the period of time in which the STPCLK# signal is inactive are sequentially displayed as numerals, and the data for the average of the power consumption during the predetermined period of time or the data for the measured power consumption are displayed in the time transient manner, or the average of the power consumption in a period shorter than the predetermined period of time is displayed sequentially.

Figures 8, 9:
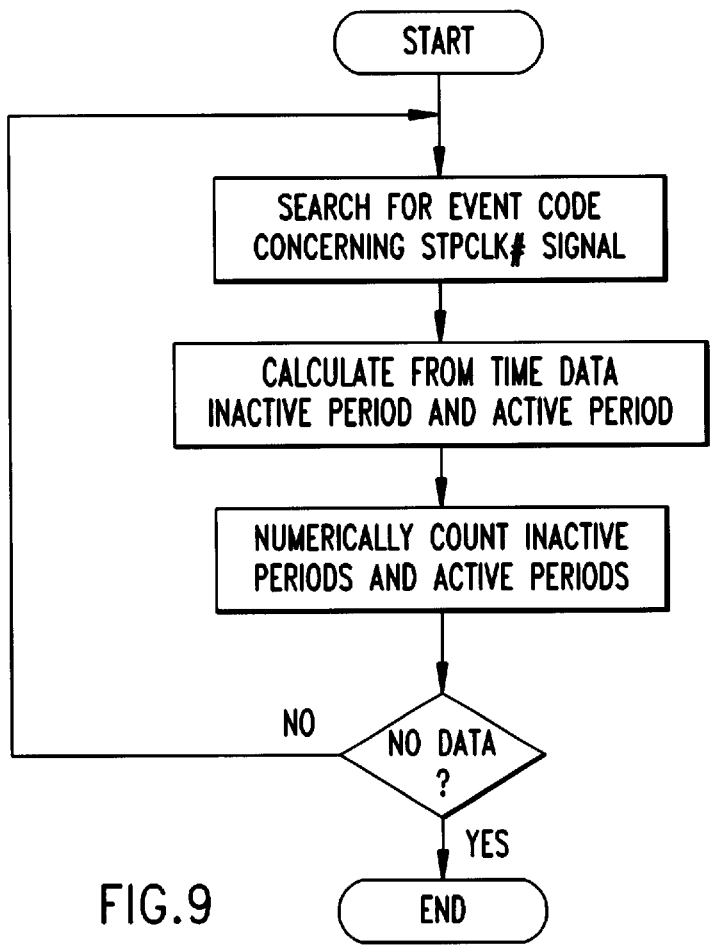
FIG. 8 is a diagram showing an example screen on the display device 121.
FIG. 9 is a flowchart for the processing performed by the visualization processor 119.

For example, the form (5) corresponds to a case where, during the predetermined period, the period in which the STPCLK# signal is active and the period in which the STPCLK# signal is inactive are sorted by using their numerals and are counted For example, as shown in FIG. 8, when a specific benchmark is executed, the frequencies of the periods during which the STPCLK# signal is inactive and the periods during which the STPCLK# signal is active are displayed. The visualization processor 119 searches for an event code concerning the STPCLK# signal, and calculates the inactive period extending from the entry into the inactive state to the entry to the active state, and the active period extending from the entry into the active state to the entry into the inactive state. Then, the values for the individual periods are sorted for the inactive period and the active period, and the frequencies are counted. This process is illustrated in FIG. 9.

For example, the form (6) corresponds to a case where the data obtained in (5) and the period in which the CPU_STP# signal is active during a predetermined period are calculated, then the CPU_ACTIVE (Burst) state in which the CPU in the burst state is operated, the CPU_ACTIVE (Throttling) state in which the CPU is operated while CPU throttling is performed, the STOP_GRANT (Throttling) state in which the operation is halted while the CPU throttling is performed, and APM (Advanced Power Management: see Advanced Power Management (APM) BIOS Interface Specification Revision 1.2, February 1996, Intel Corporation, Microsoft Corporation), and the STOP_GRANT (APM) state in which the operation of the CPU is halted and the STOP_CLOCK state in which the CPU_STP# signal is active are identified, and the individual states relative to the predetermined period are displayed. At the same time, the power consumption data (e.g., average of the power consumption) may be displayed. This is shown by the example in FIG. 10, where there are displayed the results of seven measurements made when different software applications were executed. Through this process, the amount of the power consumption by each software application and the corresponding operating states of the CPU can be obtained. Especially apparent for App2 in FIG. 10, a large amount of power was consumed because the STOP_GRANT state was not present and the ratio of the operation of the CPU was high.

To provide such a display, the visualization processor 119 first performs the same process as in (5). Then, the visualization process searches for event code concerning the CPU_STP# signal, and calculates, from the time data, the period in which CPU_STP# signal is active. This period is defined as STOP_CLOCK state.

The CPU throttling will be briefly explained. Because of the characteristic of CPU throttling, the period in which the STPCLK# signal is active/inactive tends to be fixed, and when the lengths of the periods are calculated, the frequency of some constant value becomes very large. When the PIIX4 chip is employed, the STPCLK# signal becomes active/inactive at intervals of a multiple of a value obtained by dividing 244 μs by 8. Even taking the measurement errors into consideration, the active/inactive periods tend to fall within the range of a constant value ±1 μs. Therefore, in the example of FIG. 8 since the STPCLK# signal tends to become inactive during the 61 μs and 62 μs periods, it is found that throttling is performed in a period that is ¼ of 244 μs. This is also found from the fact that the frequencies of the active periods are large when these periods are 184 μs and 185 μs. In this example, an inactive period of the STPCLK# signal, the frequency of which is largest and which falls within the error ±1 μs, ×its count is defined as the CPU_ACTIVE (Throttling) state. Even when a computer that dynamically changes the ratio of the throttling is employed, this ratio can be identified because it is limited to only eight different ratio types when the core chip such as PIIX4 is employed.

The other periods in which the STPCLK# signal is active are defined as the CPU_ACTIVE (Burst) state. Further, an active period of the STPCLK# signal, the frequency of which is largest and that falls within the error range ±1 μs, × its count, is defined as the STOP_GRANT (Throttling) state. The other periods in which the STPCLK# signal is active are defined as STOP_GRANT (APM) states. When the intervals for the individual states are calculated and the individual ratios relative to a predetermined period of time are calculated, the display (for one band shown in FIG. 10) can be provided. The process is illustrated in the flowchart in FIG. 11.

another process for identifying the state of a computer component or the state of the entire computer can be performed. For example, when power management signals to the individual components are observed, the states of their components can be identified. In addition, since the power consumed by the CPU is large, it can be assumed that the operating state of the CPU represents the operating state of the entire computer.

The above described characterization process is merely an example. When the power control signal and the power signal are measured and recorded in the above described manner, their relationship can be clearly understood from various angles, and the operating state of the entire computer or of a computer component, or the relationship between the operating state and the power consumption, can be clearly obtained. A combination of several of the above examples may be displayed.

Although only the flowcharts for the visualization processor 119 are shown, a dedicated circuit can be provided for all the processing, or the part of the process that can be performed in common. For example, for a process for accumulating the active periods, a circuit can be provided that employs a timer to count or to halt the counting of active periods each time a specific event code is detected. This circuit can be provided inside the signal monitor 115, and in this case, the output data can be directly input to the visualization processor 119, without being stored in the memory 117. It is also possible, depending on the contents of the process, for data to be output directly from the signal monitor 115 to the visualization processor 119, without being stored in the memory 117.

The invention has been described with reference to several specific embodiments. One having skill in the relevant art will recognize that modifications may be made without departing from the spirit and scope of the invention as set forth in the appended claims.

Having thus described our invention, what we claim as new and desire to secure by Letters Patent is:

1. A method for analyzing the power consumption of a computer, comprising the steps of:

detecting a change in a power control signal, said power control signal representing a control instruction associated with the power consumption to a component of said computer;

storing the result of the detection in a storage device;

periodically measuring at least one of a first signal concerning the power consumption by a predetermined component of said computer and a second signal concerning the power consumption by the entire computer;

storing the result of the measurement in said storage device; and comparing said results of said detection and of said measurement to analyze the power consumption.

2. The method according to claim 1, further comprising the step of, based on the results of said detecting and of said measuring, characterizing the relationship between said power control signal and said power consumption.

3. The method according to claim 1, further comprising the step of, based on the results of the detecting and of said measuring, displaying said change in said power control signal and a change in said power consumption along a time axis.

4. The method according to claim 1, further comprising the step of, based upon the results of said detecting and of said measuring, displaying a change in the contents of said control instruction and a change in said power consumption along a time axis.

5. The method according to claim 1, further comprising the step of identifying the state of said computer by processing the result of said detection stored in said storage device.

6. The method according to claim 1, further comprising the step of identifying the state of a component of said computer by processing the result of said detection stored in said storage device.

7. The method according to claim 1, further comprising the step of, by using the result of the detecting and measuring, displaying the ratio of each state of said control power signal and data concerning said power consumption for a predetermined period of time.

8. The method according to claim 1, further comprising the step of, based on the results of said detecting and measuring, displaying a period of each state of said power control signal and data concerning said power consumption for a predetermined period of time.

9. The method according to claim 1, further comprising the step of, based on the results of said detecting and measuring, displaying data concerning a change in said power control signal and an average power consumption for a predetermined period of time.

10. An apparatus for analyzing the power consumption of a computer, comprising:

a storage device; and a measurement device for detecting a change in a power control signal, said power control signal representing a control instruction associated with the power consumption to a connected component of said computer, and for measuring a first signal concerning the power consumption by said connected component and a second signal concerning the power consumption by the entire computer, and for storing the results of the detection and of the measuring in said storage device; and an analysis component for comparing the results of the detection and of the measuring to analyze said power consumption.

11. The apparatus according to claim 10, further comprising a processor for characterizing a relationship between said control instruction and said power consumption by using said results of said detection and of said measuring, which are stored in said storage device.

12. The apparatus according to claim 10, further comprising a processor for generating data for displaying said change in said power control signal and a change in said power consumption along the same kind of a time axis by using said results of said detection and of said measuring, which are stored in said storage device.

13. The apparatus according to claim 10, further comprising a processor for generating data for displaying a change in the contents of said control instruction and a change in said power consumption along the same kind of a time axis by using said results of said detection and of said measuring, which are stored in said storage device.

14. The apparatus according to claim 10, further comprising a processor for processing the result of the detection stored in said storage device, and generating data for identifying the state of said computer.

15. The apparatus according to claim 10, further comprising a processor for processing the result of the detection stored in said storage device and generating data for identifying the state of a component of said computer.

16. The apparatus according to claim 10, further comprising a processor for generating data for displaying the ratio of each state of said control power signal and an average power consumption for a predetermined period of time by using the results of the detection and of the measuring, which are stored in said storage device.

17. The apparatus according to claim 10, further comprising a processor for generating data for displaying a period and a count of each state of said power control signal by using the result of the detection stored in said storage device.

18. The apparatus according to claim 10, further comprising a processor for generating data for displaying data concerning a change in said power control signal and an average power consumption for a predetermined period of time by using the results of the detection and of the measuring, which are stored in said storage device.

19. The method according to claim 1, further comprising the step of, by using the results of the detection stored in said storage device, acquiring statistics about the length of the period of each state of said power control signal for a predetermined period of time, and identifying the state of said computer in accordance with said statistics.

20. A method for analyzing the power consumption, comprising the steps of:

detecting a change in a power control signal, said power control signal representing a control instruction associated with the power consumption to a component of said computer;

periodically measuring at least one of a first signal concerning the power consumption by a predetermined component of said computer and a second signal concerning the power consumption by the entire computer; and based on said results of said detection and of said measurement, characterizing a relationship between said control instruction and said power consumption.

21. A program storage device readable by a machine, tangibly embodying a program of instructions executable by the machine to perform method steps for analyzing power consumption of a computer, said method steps comprising:

detecting a change in a power control signal, said power control signal representing a control instruction associated with the power consumption to a component of said computer;

periodically measuring at least one of a first signal concerning the power consumption by a predetermined component of said computer and a second signal concerning the power consumption by the entire computer; and based on said results of said detection and of said measurement, characterizing a relationship between said control instruction and said power consumption.

* * * * *